US007953799B2

(12) United States Patent
Patil et al.

(10) Patent No.: US 7,953,799 B2
(45) Date of Patent: May 31, 2011

(54) SERVICE CONTROL DEVICE AND METHOD

(75) Inventors: Basavaraj Patil, Coppell, TX (US); Khiem Le, Coppell, TX (US); Stefano Faccin, Dallas, TX (US); Curt Wong, Plano, TX (US); Srinivas Sreemanthula, Arlington, TX (US); Kengatharan Sivalingam, Irving, TX (US)

(73) Assignee: Nokia Siemens Networks Oy (FI)

( * ) Notice: Subject to any disclaimer, the term of this patent is extended or adjusted under 35 U.S.C. 154(b) by 1019 days.

(21) Appl. No.: 09/792,705

(22) Filed: Feb. 23, 2001

(65) Prior Publication Data
US 2002/0120691 A1    Aug. 29, 2002

(51) Int. Cl.
G06F 13/00    (2006.01)
(52) U.S. Cl. ........ 709/206; 709/222; 709/220; 709/237; 717/115
(58) Field of Classification Search .................. 709/227, 709/206, 230, 237, 220–222; 379/900; 717/114, 717/115
See application file for complete search history.

(56) References Cited

U.S. PATENT DOCUMENTS

| 5,905,958 | A  | * | 5/1999  | Houde ........................... 455/437 |
| 5,991,803 | A  | * | 11/1999 | Glitho et al. ................... 709/220 |
| 6,161,134 | A  | * | 12/2000 | Wang et al. .................... 709/220 |
| 6,226,516 | B1 |   | 5/2001  | Gupta et al. |
| 6,389,124 | B1 | * | 5/2002  | Schnarel et al. ......... 379/142.01 |
| 6,397,058 | B1 | * | 5/2002  | Thibert et al. ............. 455/414.1 |
| 6,701,366 | B1 | * | 3/2004  | Kallas et al. .................. 709/227 |
| 6,940,847 | B1 | * | 9/2005  | Glitho et al. .................. 370/352 |
| 2002/0120729 | A1 | * | 8/2002  | Faccin et al. .................. 709/223 |
| 2002/0120746 | A1 | * | 8/2002  | Patil et al. .................... 709/227 |
| 2002/0160810 | A1 | * | 10/2002 | Glitho et al. .................. 455/560 |

FOREIGN PATENT DOCUMENTS

| CA | 2313852 A1 | * | 1/2001 |
| EP | 0 873 029 A1 |   | 10/1998 |
| WO | WO 00/42760 |   | 7/2000 |
| WO | WO 02/19731 |   | 9/2000 |
| WO | WO 02/19731 A1 | * | 3/2002 |
| WO | WO 02/19732 |   | 3/2002 |
| WO | WO 02/19732 A1 | * | 3/2002 |

OTHER PUBLICATIONS

Olle Pellijeff; A Service Creation and Execution Environment Based on the Intelligent Network Concept; Uppsala University Master's Thesis; Computing Science Department; pp. 1-48; Dec. 1995.*
Huan Adele Wang; Building Value-Added Services Using Mobile Agents in SIP Based Internet Telephony; Master's Thesis; McGill University, Montreal; Jul. 1999.*
Ismail Dalgic et al.; True Number Portability and Advanced Call Screening in a SIP-Based IP Telephony System; IEEE Communications Magazine; pp. 96-101; Jul. 1999.*

* cited by examiner

*Primary Examiner* — Kenneth R Coulter
(74) *Attorney, Agent, or Firm* — Hahn Loeser & Parks LLP

(57) ABSTRACT

The invention relates to a service control device and method for controlling service execution in a communication network. A service script for a user is loaded in response to the receipt of an incoming message, and it is checked based on a comparison of the loaded service script and the incoming message whether a service is to be triggered. If a service triggering has been determined, a service is activated in an external service execution environment. Due to the fact that the service execution is not performed in the service control point but in an external service execution environment, the service logic does not have to be provided at the service control point. It provides a flexible way to define, execute, and control user-specific, operator, and third party services combining various service capabilities.

17 Claims, 2 Drawing Sheets

SERVICE CONTROL DEVICE AND METHOD

FIELD OF THE INVENTION

The present invention relates to a service control device and method for controlling service execution in a communication network, e.g. an execution of a service such as VoIP (Voice over IP), multimedia, e-mail, instant messaging, WEB browsing, WAP and the like in an IP-based network.

RELATED APPLICATIONS

U.S. patent application Ser. No. 09/792,706 filed Feb. 23, 2001 is related to the present application.

BACKGROUND OF THE INVENTION

In a communication environment, service scripts provide a means to create and manage value added services in a centralized session but distribute fully the service execution. The service logic is defined with a script which can be moved between functional elements in a communication network and which is executed in a suitable functional element. Usable script languages can be, for example, CPL (Call Processing Language), SIP Servlets (SIP:Session Initiation Protocol) representing executable instructions which handle SIP messages, or CGI (Common Gateway Interface).

The CPL language scripts are distributed to the servers participating in the handling of calls that need to be effected using these supplementary services. The scripts are inserted to these servers by the network management system, end-users or administrators. There can be several CPL script instances participating to the handling of a given call. The individual script instances are triggered and executed on signaling events conforming to predefined trigger conditions such as caller or callee identification. For example, when there is an incoming call to a subscriber who has defined an incoming call screening script, the script is executed because the callee identification matches.

In general, service scripts provide an efficient, portable and powerful tool for executing control instructions in a distributed network. Service scripts are for example used in Internet Web pages to create different kinds of effects for users. A service script is transferred or downloaded from a Web server to the local computer and executed there.

Moreover, using CPL scripts in connection with SIP Invite messages provides an opportunity to execute services in proxy nodes as specified by a user in an IN (Intelligent Network) network type.

However, due to the fact that the service scripts are stored and executed at a plurality of call control functional units or servers, especially in case of widely used services, a high amount of signaling is required to update service scripts or to adapt service scripts to new service features. Additionally, the fast evolution of IP (Internet Protocol) networks leads to an increased range of user-specific services leading to a demand for a higher flexibility of creating and configuring new services in the network with minimal disruption.

However, the traditional IN model is not flexible enough to integrate Internet type of services, such as Web browsing, presence, instant messaging, click2dial, and e-mail modifications, and to provide attractive and diverse services to users. Thus, a new solution for triggering and controlling services in an IP based service architecture is required.

SUMMARY OF THE INVENTION

It is an object of the present invention to provide a method and device for controlling service execution in a communication network, by means of which a flexible service provision and control can be obtained.

This object is achieved by a method for controlling service execution in a control point of a communication network, said method comprising the steps of:
loading a service script for user in response to the receipt of an incoming message;
checking whether a service is triggered based on a comparison of the incoming message with the loaded service script; and
activating a service in an external service execution environment if a service triggering has been determined in said checking step.

Additionally, the above object is achieved by a device for controlling service execution in a communication network, said device comprising:
service script executing means for loading a service script in response to the receipt of an incoming message, and for checking whether a service is triggered based on a comparison said incoming message with said loaded service script; and
service activating means for activating a service in an external service execution environment in response to the receipt of a request for service invocation from said service script executing means.

Accordingly, the service is activated in some external service execution environment and not directly in the service control point. Thus, the service logic does not have to be contained in the service script and can be distributed over the communication network or core network without any restriction to a particular language or logic. This provides a flexible way to define, execute, and control user-specific, operator, and third party services combining various SIP/IP-based service capabilities.

The activating step may comprise a message processing step if an existing message is to be modified or if a new message is to be created. To achieve this, the service activating means may be arranged to contact a message processing means if a message processing is required. This message processing means may be e.g. an SIP message processor. Furthermore, the message processing means may be arranged to modify an existing message or to create a new message in response to a corresponding request from the service activating means.

Additionally, a protocol engine means may be provided for receiving and transmitting protocol messages, and for passing incoming messages to the service script executing means. This protocol engine means may be e.g. an SIP engine.

Preferably, service scripts of active users may be stored in a temporary storing means. In particular, the service script may comprise a service description and triggering information, needed to invoke said service activation in said external environment. A service may be triggered when a match is determined for a given trigger condition in the triggering information. The service description may comprise an IP address of an external execution point and/or an IP address of an external logic repository server. The invocation and coordination of service execution may be performed in at least two external execution points. In this case, a service interaction information may be coded in the service script. Furthermore, a firewall function may be performed towards service execution in other service execution environments.

An active service may be terminated in response to the receipt of a corresponding request from the communication network.

The control point may be arranged to handle both mobile-originated and mobile-terminated calls for an active user.

BRIEF DESCRIPTION OF THE DRAWINGS

In the following, the present invention will be described in greater detail bases on a preferred embodiment with reference to the drawing figures, in which.

DESCRIPTION OF THE PREFERRED EMBODIMENT

The preferred embodiment will now be described based on a service execution management functional unit or control point in an IP-based service architecture which may be implemented in any IP-based network or third generation mobile communication network such as a UMTS (Universal Mobile Telecommunications System) network.

Figure 1:
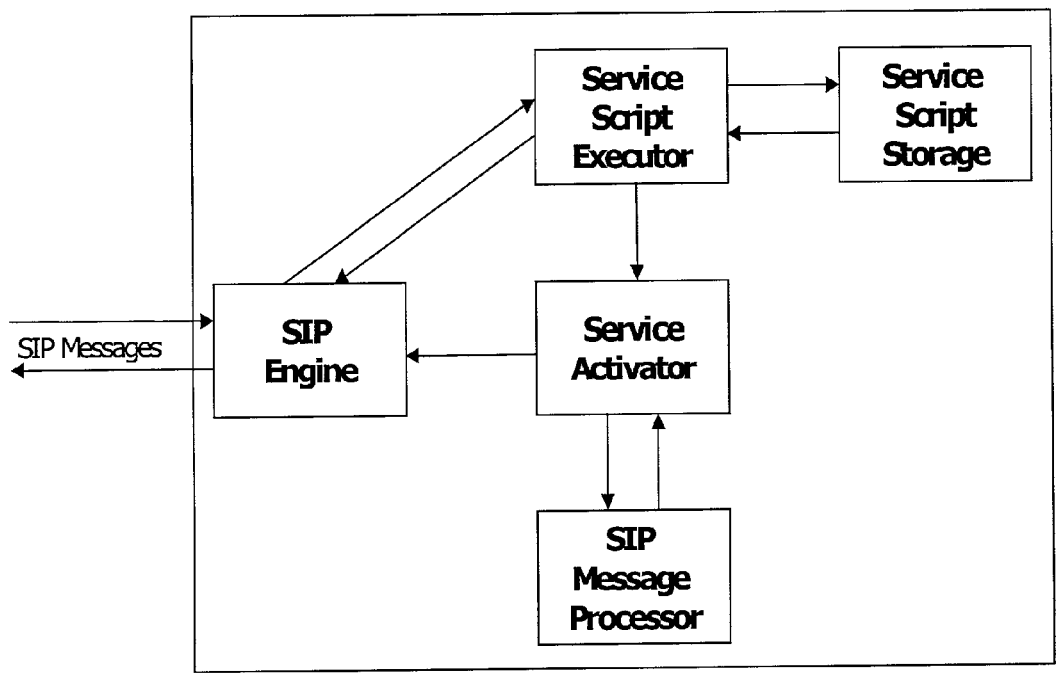
FIG. 1 shows a schematic block diagram of a service control point according to the preferred embodiment.

FIG. 1 shows a schematic block diagram of the service execution management functional unit of the IP-based service architecture which is capable of supporting multimedia and integrating different types of IP-based services. This service triggering and control point comprises an SIP engine 1 responsible for receiving and sending SIP (Session Initiation Protocol) messages, wherein incoming messages are passed to a service script executor 2 for service triggering. The service script executor 2 is arranged to load a service script for the active user of the incoming message from a service script storage 5 arranged for temporarily storing service scripts of active or registered users.

Based on a comparison between the information received from the SIP engine 1 and the information given in the loaded service script, services are invoked and executed in external execution environments.

The service script is a unique script for a user and it includes information about service descriptions and triggering information for that particular user. The service script may be written using some XML-like language and may be pushed from a central database to the service script storage 5 e.g. for update purposes. The service description part in the service script includes information needed in order to execute the service in the external environment, e.g. IP addresses of an external execution point and a service logic repository server in which service codes or logics for implementing services are stored. The service logic can be transferred from the repository server to the execution point either offline or dynamically during service invocation. The external execution point may be any execution environment for different forms or languages of logic (e.g. Java, TPL, XML, CGI etc.).

In particular, a service is triggered by the service script executor 2 when a match is determined for a given condition in the triggering information of the concerned service script. To achieve this, the Service script executor 2 matches the information received from the SIP engine 1 with the triggering conditions of the service script.

The service script storage 5 is a temporary storage for keeping service scripts of active users. The service scripts may be pushed and updated by an external network element, such as a service script database.

If the Service script executor 2 determines that a service is triggered, a request for service invocation is issued by the service script executor 2 to a service activator 3 with all the necessary information for service invocation. The service activator 3 activates the service in the indicated external service execution environment and controls the execution. However, it does not directly execute the service. It only invokes and controls the service execution in the external environment based on corresponding messages submitted to the external network via the SIP engine 1. If a SIP message processing is required before service execution, the service activator 3 contacts a SIP message processor 4 which is responsible to modify an existing SIP message or to create a new message if it receives a corresponding request from the service activator 3.

In particular, the service activator 3 may invoke and coordinate service execution in one or more external execution points based on a corresponding address information in the service script and by corresponding messages issued via the SIP engine 1. For service interaction in the external environment, a service interaction information may be coded in the concerned service script. Furthermore, the control point shown in FIG. 1 may be arranged to perform firewall functions towards the service execution in other and third party service execution environments to thereby prevent any distribution of harmful contents through the network environment.

Furthermore, a function may be provided to terminate some or all active services upon request from the core or external network via the SIP engine 1. Moreover, the control point may be arranged to handle both mobile-originated and mobile-terminated calls for an active user to allow possible mobile-originated and mobile-terminated call interactions.

In the following, a user registration is described based on the block diagram of FIG. 1. When a SIP Register message is received by the SIP engine 1, it is routed to a corresponding service script database of the service architecture. The service script database may respond with a 200 OK message comprising the service script of the new active user. When the SIP engine 1 receipts the 200 OK message with the service script, it routes the message to the service script executor 2 which loads the received new service script in the temporary service script storage 5. Thereby, the new user is registered as an active user in the control point. When the user is de-registered or cancelled, the service script is removed from the temporary service script storage 5.

Figure 2:
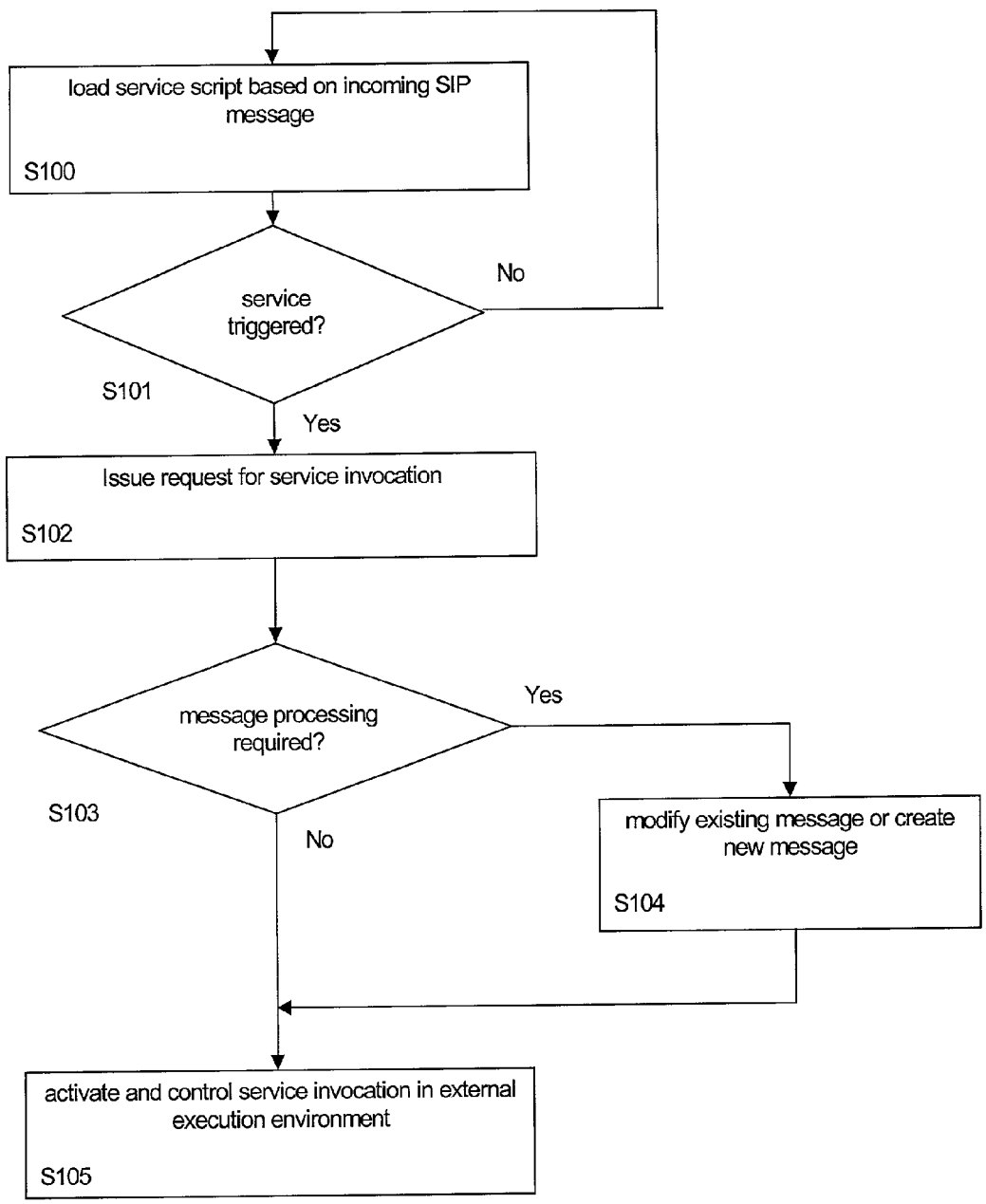
FIG. 2 shows a basic flow diagram of a service activation procedure according to the preferred embodiment.

FIG. 2 shows a flow diagram of a service activation procedure. A service script is loaded based on an incoming SIP message, when a message event occurs and a message is routed via the SIP engine 1 to the service script executor 2. Then, it is checked by the service script executor 2 based e.g. on the triggering condition defined in the loaded service script whether a service is triggered (step S101). If no service triggering is determined in step S101, the procedure returns to step S100 until a new message event occurs.

If a service is determined to be triggered in step S101, the service script executor 2 issues a request for service invocation in step S102. In response to this request, the service activator 3 checks whether a message processing is required (step S103) to invoke the service. If such a message processing is required, the service activator 3 contacts the SIP message processor 4 to modify an existing message or to create a new message (step S104). Then, the process proceeds to step S105. If no message processing is required in step S103, the service activator activates and controls service invocation in the external environment by issuing a corresponding message or signaling (step S105). The service invocation may be signaled to a plurality of external application execution engines which may themselves invokate services in other application execution engines so as to provide serial or parallel services in the network environment. Thus, there is no need to maintain a relation between the call state of the received main call and the calls generated by the IP-based service architecture.

Thereby, a flexible way is provided to combine various SIP- or IP-based service capabilities in the external network, while the required service logic does not have to be provided at the service control point.

It is noted that the present invention can be applied to any service architecture in any network and is not restricted to a SIP messaging environment. The preferred embodiment may thus vary within the scope of the attached claims.

The invention claimed is:

1. A method with respect to a control point of a communication network for activating and controlling a service execution, said method comprising:
    loading a service script for a user in response to the receipt of an incoming message, wherein the service script includes a service description and triggering information, and wherein the service description provides information about an external service execution environment and a service logic repository server;
    determining if a service is to be triggered based on a comparison of said incoming message with said triggering information;
    sending a request for service invocation if the result of said determining is positive; and
    activating and controlling the service in the external service execution environment indicated in the service description using a service logic provided by the service logic repository server.

2. The method according to claim 1, wherein said activating step comprises a message processing step if an existing message is to be modified or if a new message is to be created.

3. The method according to claim 1, further comprising the step of temporarily storing service scripts for active users in said control point.

4. The method according to claim 1, wherein said service description comprises an IP address of said external service execution environment and/or an IP address of said service logic repository server.

5. The method according to claim 1, further comprising the step of invoking and coordinating service execution in at least two external execution points.

6. The method according to claim 5, further comprising the step of coding a service interaction information in said service script.

7. The method according to claim 1, further comprising the step of performing a firewall function towards service execution in other service execution environments.

8. The method according to claim 1, further comprising the step of terminating an active service in response to the receipt of a corresponding request from said communication network.

9. The method according to claim 1, further comprising the step of handling both mobile-originated and mobile-terminated calls for said user in said control point.

10. A device for controlling service execution with respect to a control point in a communication network, said device comprising:
    means for loading a service script for a user in response to the receipt of an incoming message, wherein the service script includes a service description and triggering information, and wherein the service description provides information about an external service execution environment and a service logic repository server;
    means for determining if a service is to be triggered based on a comparison of said incoming message and said triggering information;
    means for sending a request for service invocation if the result of said determining is positive; and
    means for activating and controlling the service in the external service execution environment indicated in the service description using a service logic provided by the service logic repository server.

11. The device according to claim 10, further comprising protocol engine means for receiving and transmitting protocol messages and for passing incoming messages to said means for loading a service script.

12. The device according to claim 11, wherein said protocol engine means is an SIP engine.

13. The device according to claim 10, wherein said means for activating and controlling is arranged to contact a message processing means if a message processing is required.

14. The device according to claim 13, wherein said message processing means is an SIP message processor.

15. The device according to claim 13, wherein said message processing means is arranged to modify an existing message or to create a new message in response to a corresponding request from said means for activating and controlling.

16. The device according to claim 10, further comprising temporary storing means for storing service script of active users.

17. The device according to claim 10, wherein said means for activating and controlling is arranged to invoke and coordinate service execution in at least two external execution points.

* * * * *